United States Patent [19]

Trabandt

[11] Patent Number: 5,256,221
[45] Date of Patent: Oct. 26, 1993

[54] PNEUMATIC VEHICLE TIRE WITH MIRROR SYMMETRICAL TREAD ELEMENTS

[75] Inventor: Hagen Trabandt, Sehnde, Fed. Rep. of Germany

[73] Assignee: Uniroyal Engelbert Reifen GmbH, Aachen, Fed. Rep. of Germany

[21] Appl. No.: 754,939

[22] Filed: Sep. 4, 1991

[30] Foreign Application Priority Data

Sep. 4, 1990 [DE] Fed. Rep. of Germany ....... 9012612

[51] Int. Cl.$^5$ .............................................. B60C 11/11
[52] U.S. Cl. ................................................ 152/209 R
[58] Field of Search ........... 152/209 R, 209 A, 209 R; D12/146, 147, 148–149

[56] References Cited

U.S. PATENT DOCUMENTS

| | | | |
|---|---|---|---|
| D. 266,920 | 11/1982 | Candiliotis | D12/147 |
| D. 287,841 | 1/1987 | Ono | D12/147 |
| D. 304,706 | 11/1989 | Nakatani | D12/147 |
| D. 312,995 | 12/1990 | Tagashira | D12/147 |
| D. 320,966 | 10/1991 | Miller et al. | D12/147 |
| 4,481,991 | 11/1984 | Pieper | 152/209 R |

FOREIGN PATENT DOCUMENTS

| | | | |
|---|---|---|---|
| 0348335 | 12/1989 | European Pat. Off. | 152/209 R |
| 3247465 | 6/1984 | Fed. Rep. of Germany . | |
| 0125410 | 5/1988 | Japan | 152/209 R |
| 0162308 | 7/1988 | Japan | 152/209 R |
| 0287605 | 11/1988 | Japan | 152/209 D |
| 0045203 | 2/1990 | Japan | 152/209 R |
| 3125608 | 5/1991 | Japan | 152/209 D |

*Primary Examiner*—Michael W. Ball
*Assistant Examiner*—Nancy T. Krawczyk
*Attorney, Agent, or Firm*—Robert W. Becker & Associates

[57] ABSTRACT

A pneumatic vehicle tire of a radial belt construction has a tire tread comprising first trapezoidal tread elements that are arranged in circumferential rows and slanted transverse rows whereby the circumferential rows and the slanted transverse rows are separated from one another by circumferential grooves and slanted transverse grooves. The first trapezoidal tread elements form pairs that are enclosed by adjacent ones of the circumferential grooves and adjacent ones of the slanted transverse grooves. The first trapezoidal tread elements of such a pair are arranged adjacent to one another within one of the slanted transverse rows in a mirror-symmetrical manner relative to one another and are staggered relative to one another in a circumferential direction of the tire. The tread elements of such a pair are separated by a short circumferential groove at a bottom of which a circumferential cross-piece is provided that connects the tread elements of the pair. The slanted transverse rows have a respective transverse center line that is disposed at an angle of from 60° to 80° relative to a circumferential center line of the tire, whereby the slanted transverse edges of the first trapezoidal tread elements are essentially parallel to the transverse center line. Second trapezoidal tread elements are arranged in axially outwardly disposed circumferential rows and form pairs in the circumferential direction of the tire. One of the second trapezoidal tread elements of such a pair has a greater contact surface than the other. The second trapezoidal tread elements of such a pair are arranged in a staggered manner relative to one another in an axial direction of the tire and are separated from one another by a transverse groove. At a bottom of the transverse groove a transverse cross-piece is provided that connects the tread elements.

8 Claims, 2 Drawing Sheets

PNEUMATIC VEHICLE TIRE WITH MIRROR SYMMETRICAL TREAD ELEMENTS

BACKGROUND OF THE INVENTION

The present invention relates to a pneumatic radial vehicle tire with a belt structure having a tire tread comprising a plurality of block-shaped tread elements with polygonal cross-sections. These tread elements are separated from one another by circumferential grooves and slanted transverse grooves and are arranged in circumferential rows and slanted transverse rows.

It is know from DE-OS 32 47 465 to provide tread elements with a polygonal cross-section and to arrange them in circumferential and slanted transverse rows. Such a tire tread provides high traction (i.e., grip) on snow and also ensures a high rate of self-cleaning of snow and slush from the tread as well as good performance characteristics on wet street surfaces.

A tire tread of the aforementioned kind requires further improvement with respect to traction and self-cleaning properties when a more detailed, respectively, finer tire tread is desired and when the tire tread elements are designed to have a certain selectable contact surface.

It is therefore an object of the present invention to provide tire tread elements of a cross-sectional shape that provide a relatively high number of tread elements on the tire tread surface and that due to a certain arrangement provide and ensure a high traction and good self-cleaning properties. Furthermore, signs of wear of the so-called saw-tooth formation should be prevented, respectively, minimized.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
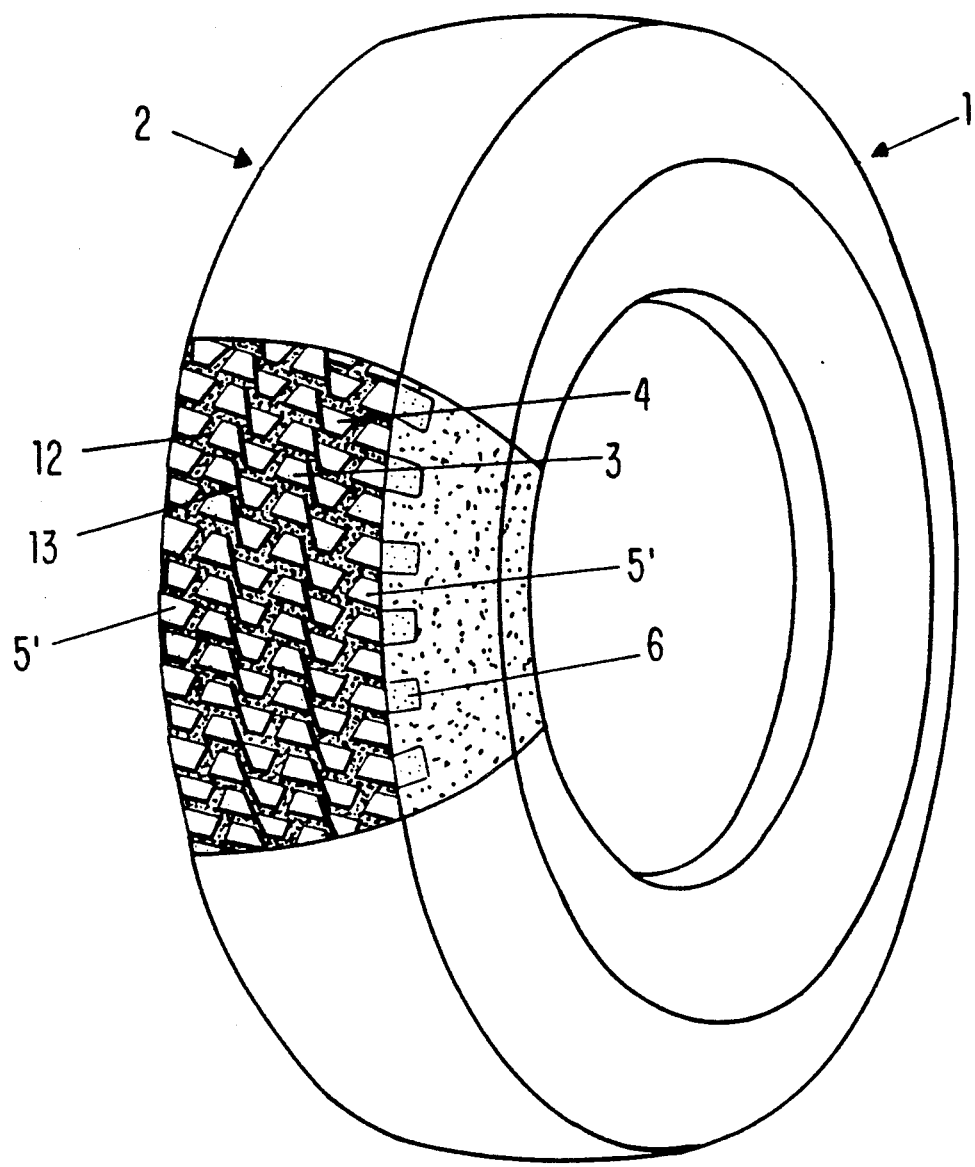
FIG. 1 shows in a perspective view a pneumatic vehicle tire with the inventive tire tread.

The pneumatic vehicle tire of the present invention is primarily characterized by: first trapezoidal tread elements that are arranged in circumferential rows and slanted transverse rows, whereby the circumferential rows and the slanted transverse rows are separated from one another by circumferential grooves and slanted transverse grooves, respectively; the first trapezoidal tread elements forming pairs that are enclosed by adjacent ones of the circumferential grooves and adjacent ones of the slanted transverse grooves; the first trapezoidal tread elements of one of the pairs being arranged adjacent to one another within one of the slanted transverse rows mirror-symmetrically to one another and staggered relative to one another in a circumferential direction of the tire; the first trapezoidal tread elements of one of the pairs being separated by a short circumferential groove at a bottom of which a circumferential cross-piece is provided that connects the first trapezoidal tread elements of the pair; and the slanted transverse rows having a respective transverse center line that is disposed at an angle of from 60° to 80° relative to a circumferential center line of the tire, whereby the slanted transverse edges of the first trapezoidal tread elements are essentially parallel to the transverse center line.

The cross-pieces connecting the first trapezoidal tread elements correspond to about half the depth of the circumferential and slanted transverse grooves. It is preferable, that at least two of the pairs of first trapezoidal tread elements are arranged within one of the slanted transverse rows.

The inventive tire tread provides high traction on snow and a high self-cleaning effect when driving on snowy or slushy streets. Furthermore, the so-called saw-tooth formation is essentially prevented.

Pneumatic vehicle tires with the described tire tread are especially useful for the driving axles of commercial vehicles.

The aforementioned tire properties are furthermore favorably influenced when the axially outwardly arranged circumferential rows are provided with second trapezoidal tread elements that form pairs in the circumferential direction of the tire, whereby one of the second trapezoidal tread elements of a respective pair has a greater contact surface than the other. The second trapezoidal tread elements of one pair, respectively, are arranged in a staggered manner relative to one another in an axial direction of the tire. The second trapezoidal tread elements of one pair, respectively, are separated from one another by a transverse groove, at a bottom of which a first transverse cross-piece is provided that connects the second trapezoidal tread elements of the respective pair.

The favorable traction and self-cleaning properties of the inventive tire tread are furthermore improved by circumferential and slanted transverse grooves having essentially the same width, whereby the circumferential grooves are zig-zag-shaped and the slanted transverse grooves are at least stepped twice.

It is preferred that the pairs of second trapezoidal tire bead elements are connected to one another by second transverse cross-pieces.

In a further preferred embodiment the second trapezoidal tread elements are connected by further cross-pieces that are arranged at shoulders of the tire and that extend in the circumferential direction of the tire.

These further cross-pieces are arranged at the bottom of the tire tread grooves.

DESCRIPTION OF PREFERRED EMBODIMENTS

Figure 2:
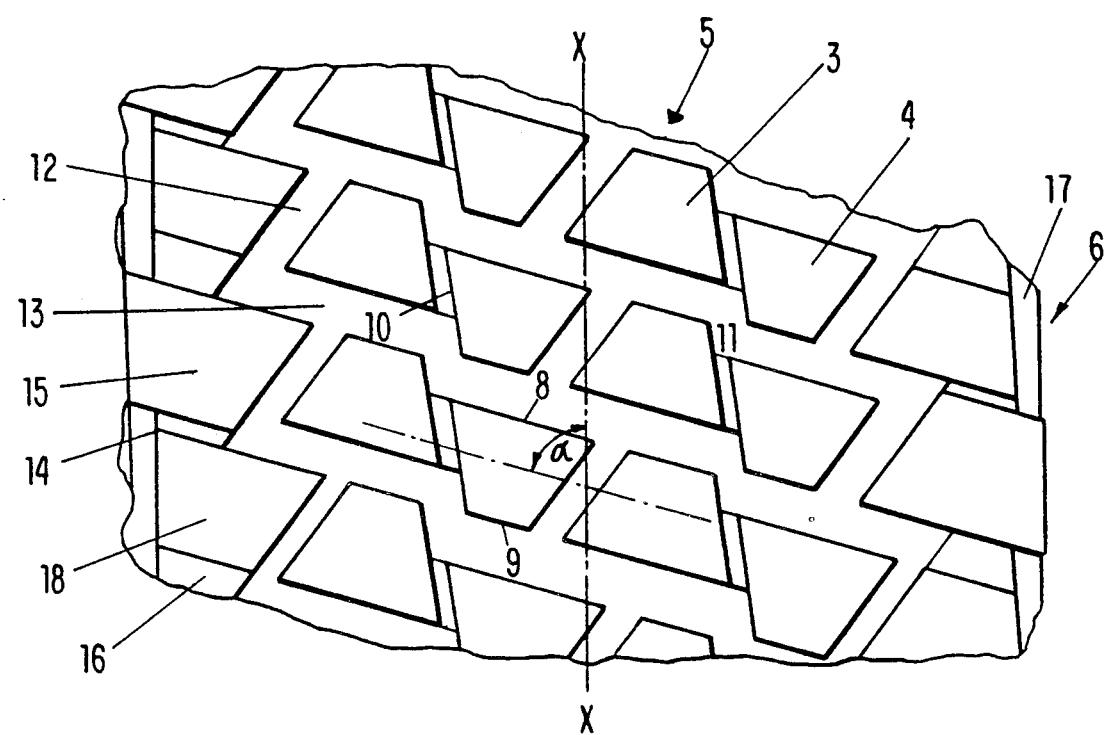
FIG. 2 shows a detailed, enlarged view of the tire tread according to FIG. 1.

The present invention will now be described in detail with the aid of several specific embodiments utilizing FIGS. 1 and 2.

The pneumatic vehicle tire 1 comprises a tire tread 2 that consists of block-shaped first tread elements 3, 4 which have a trapezoidal cross-section. The first trapezoidal tread elements 3,4 are arranged in circumferential rows 5 and in slanted transverse rows 6. The slanted transverse rows 6 (compare the imaginary center line 7) is disposed at an angle of from 60° to 80° relative to a circumferential center line x—x of the tire. The transverse edges 8, 9 of the first trapezoidal tread elements 3, 4 are arranged essentially parallel to the imaginary center line 7.

The special arrangement of the aforementioned first trapezoidal tread elements 3, 4 is essentially characterized by two neighboring tread elements 3, 4 forming a pair. The two tread elements 3, 4 are separated from one another by a relatively narrow groove 10 and are connected to one another by a cross-piece 11 which is provided at the bottom of the groove 10.

The tread elements 3, 4 are mirror-symmetrical to one another and are staggered relative to one another in the circumferential direction of the tire. The tread elements 3,4 forming one pair are enclosed by circumferential grooves 12 and slanted transverse grooves 13, whereby the circumferential grooves are zig-zag-shaped and the slanted transverse grooves are stepped. The mirror symmetrical plane of the tread elements 3,4 is parallel to the slanted transverse grooves 13.

The second trapezoidal tread elements 15, 18 within the axially outwardly arranged circumferential rows 5' are arranged such that two of the second trapezoidal tread elements form a pair in the circumferential direction of the tire. One of the tread elements 15 of such a pair has an enlarged contact surface with respect to the other tread element 18 of the pair. The tread elements 15, 18 are staggered relative to one another in a transverse direction and are connected to one another in the circumferential direction by cross-pieces 14 that are provided at the bottom of extensions of the slanted transverse tire tread grooves 13 extending into the axially outwardly arranged circumferential row 5'. The cross-pieces 14 extend to about half the depth of the circumferential and slanted transverse tire tread grooves 12 and 13.

The tread elements within the circumferential rows 5' may furthermore be provided with respective second transverse cross-pieces 16 provided at the bottom of the aforementioned extensions of the slanted transverse tire tread grooves 13. The cross-pieces 16 connect the pairs of second tire tread elements 15 to one another. A further cross-piece 17 may be provided which is arranged at the axially outwardly tire edge and which connects the second trapezoidal tread elements at the shoulder of the tire (see FIG. 2). The cross-pieces 11, 14, 16 as well as the cross-piece 17 extend to about half the profile depth of the grooves 12, 13.

The inventive tire tread ensures high traction and high self-cleaning properties, prevents sliding, has good steering characteristics, excellent drainage and prevents saw-tooth-type wear.

The present invention is, of course, in no way restricted to the specific disclosure of the specification and drawings, but also encompasses any modifications within the scope of the appended claims.

What I claim is:

1. A pneumatic vehicle tire of a radial belt construction having a tire tread comprising:
    first trapezoidal tread elements that are arranged in circumferential rows and slanted transverse rows, said circumferential rows and slanted transverse rows being separated from one another by circumferential grooves and slanted transverse grooves, respectively;
    said first trapezoidal tread elements forming pairs that are enclosed by adjacent ones of said circumferential grooves and adjacent ones of said slanted transverse grooves;
    said first trapezoidal tread elements of one said pair being arranged adjacent to one another within one of said slanted transverse rows and staggered relative to one another in a circumferential direction of said tire, said trapezoidal tread elements being symmetrical to a mirror plane relative to one another, with the mirror plane extending parallel to said slanted transverse grooves and with parallel sides of said trapezoidal tread elements forming slanted transverse edges and extending parallel to said mirror plane;
    said first trapezoidal tread elements of one said pair being separated by a short circumferential groove at a bottom which a circumferential cross-piece is provided that connects said first trapezoidal tread elements of said pair; and
    said slanted transverse rows having a respective transverse center line that is disposed at an angle of from 60° to 80° relative to a circumferential center line of said tire, with said slanted transverse edges of said first tread elements being essentially parallel to said transverse center line.

2. A pneumatic vehicle tire according to claim 1, wherein at least two said pairs of said first trapezoidal tread elements are arranged within one of said slanted transverse rows.

3. A pneumatic vehicle tire according to claim 1, wherein said circumferential grooves and said slanted transverse grooves are essentially of a same width, and wherein said circumferential grooves are zig-zag-shaped and said slanted transverse grooves have at least two steps.

4. A pneumatic vehicle tire according to claim 1, further comprising:
    second trapezoidal tread elements arranged in axially outwardly disposed circumferential rows and forming pairs in said circumferential direction of said tire, with one of said second trapezoidal tread elements of said pairs having a greater contact surface than the other;
    said second trapezoidal tread elements of one said pair being arranged in a staggered manner relative to one another with respect to a shoulder of said tire in an axial direction of said tire; and
    said second trapezoidal tread elements of one said pair being separated from one another by a transverse groove at a bottom of which a first transverse cross-piece is provided that connects said second trapezoidal tread elements of one said pair.

5. A pneumatic vehicle tire according to claim 4, wherein said pairs of second tread elements are connected to one another by second transverse cross-pieces.

6. A pneumatic vehicle tire according to claim 4, wherein said second trapezoidal tread elements are connected by further cross-pieces arranged at shoulders of said tire and extending in said circumferential direction of said tire.

7. A pneumatic vehicle tire of a radial belt construction having a tire tread comprising:
    first trapezoidal tread elements that are arranged in circumferential rows and slanted transverse rows, said circumferential rows and slanted transverse rows being separated from one another by circumferential grooves and slanted transverse grooves, respectively;
    said first trapezoidal tread elements forming pairs that are enclosed by adjacent ones of said circumferential grooves and adjacent ones of said slanted transverse grooves;
    said first trapezoidal tread elements of one said pair being arranged adjacent to one another within one of said slanted transverse rows mirror-symmetrically to one another and staggered relative to one another in a circumferential direction of said tire;

said first trapezoidal tread elements of one said pair being separated by a short circumferential groove at a bottom of which a circumferential cross-piece is provided that connects said first trapezoidal tread elements of said pair;

said slanted transverse tows having a respective transverse center line that is disposed at an angle of from 60° to 80° relative to a circumferential center line of said tire, with slanted transverse edges of said first tread elements being essentially parallel to said transverse center line; and at least two said pairs of said first trapezoidal tread elements arranged within one of said slanted transverse rows.

8. A pneumatic vehicle tire of a radial belt construction having a tire tread comprising:

first trapezoidal tread elements that are arranged in circumferential rows and slanted transverse rows, said circumferential rows and slanted transverse rows being separated from one another by circumferential grooves and slanted transverse grooves, respectively;

said first trapezoidal tread elements forming pairs that are enclosed by adjacent ones of said circumferential grooves and adjacent ones of said slanted transverse grooves;

said first trapezoidal tread elements of one said pair being arranged adjacent to one another within one of said slanted transverse rows mirror-symmetrically to one another and staggered relative to one another in a circumferential direction of said tire;

said first trapezoidal tread elements of one said pair being separated by a short circumferential groove at a bottom of which a circumferential cross-piece is provided that connects said first trapezoidal tread elements of said pair;

said slanted transverse rows having a respective transverse center line that is disposed at an angle of from 60° to 80° relative to a circumferential center line of said tire, with slanted transverse edges of said first tread elements being essentially parallel to said transverse center line; and said circumferential grooves and said slanted transverse grooves being essentially of a same width, and wherein said circumferential grooves are zigzag-shaped and said slanted transverse grooves have at least two steps.

* * * * *